United States Patent
Armbruster

(10) Patent No.: US 10,293,535 B2
(45) Date of Patent: *May 21, 2019

(54) RETAINING DEVICE FOR A TURNING SYSTEM

(71) Applicant: FOBOHA (GERMANY) GMBH, Haslach (DE)

(72) Inventor: Rainer Armbruster, Wolfach (DE)

(73) Assignee: FOBOHA (Germany) GmbH, Haslach (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/776,413

(22) PCT Filed: Mar. 11, 2014

(86) PCT No.: PCT/EP2014/054713
§ 371 (c)(1),
(2) Date: Sep. 14, 2015

(87) PCT Pub. No.: WO2014/140019
PCT Pub. Date: Sep. 18, 2014

(65) Prior Publication Data
US 2016/0039135 A1    Feb. 11, 2016

(30) Foreign Application Priority Data
Mar. 15, 2013    (CH) .................................... 0613/13

(51) Int. Cl.
*B29C 45/04*    (2006.01)
*B29C 45/26*    (2006.01)
(Continued)

(52) U.S. Cl.
CPC ........ *B29C 45/2606* (2013.01); *B29C 45/045* (2013.01); *B29C 45/1628* (2013.01);
(Continued)

(58) Field of Classification Search
CPC .............. B29C 45/045; B29C 45/1628; B29C 45/1742; B29C 45/2606; B29C 45/2681;
(Continued)

(56) References Cited

U.S. PATENT DOCUMENTS 4,408,981 A * 10/1983 Brown ................ B29C 45/1761
425/338
4,929,166 A * 5/1990 DiSimone ............ B23Q 1/0063
264/328.7
(Continued)

FOREIGN PATENT DOCUMENTS

CH    705 140 A2    12/2012
EP    1 035 959 B1    9/2000
(Continued)

*Primary Examiner* — James P Mackey
(74) *Attorney, Agent, or Firm* — Pauley Erickson & Kottis

(57) ABSTRACT

The invention relates to a retaining device (1) for a rotatable mold center part (2) in an injection molding machine, the retaining device comprising a plate (17) used for retaining the rotatable mold center part (2), the plate being rotatable about an axis of rotation (16) and driven by means of a motor (20). The retaining device (1) comprises a lower cross member (10), which is mounted movably in the longitudinal direction (x) on guide rails (7) while supported on a machine bed (6) of the injection molding machine by means of first bearing blocks (8). The retaining device (1) comprises second bearing blocks (23), by means of which the lower cross member (10) is supported in the circumferential direction relative to lower beams (5) of the injection molding machine.

11 Claims, 3 Drawing Sheets

(51) Int. Cl.
*B29C 45/16* (2006.01)
*B29C 45/17* (2006.01)
*B29C 45/32* (2006.01)

(52) U.S. Cl.
CPC ...... *B29C 45/1742* (2013.01); *B29C 45/2681* (2013.01); *B29C 2045/1764* (2013.01); *B29C 2045/326* (2013.01)

(58) Field of Classification Search
CPC .... B29C 2045/0458; B29C 2045/1617; B29C 2045/326; B29C 33/0088; B29C 33/38; B29C 33/3842; B29C 2045/1764
See application file for complete search history.

(56) References Cited

U.S. PATENT DOCUMENTS

| | | | | |
|---|---|---|---|---|
| 5,578,333 | A * | 11/1996 | Schad | B29C 45/32 425/338 |
| 5,772,420 | A * | 6/1998 | Holmes | B29C 45/1761 425/450.1 |
| 6,099,784 | A * | 8/2000 | Teng | B29C 45/32 264/297.2 |
| 6,503,075 | B1 * | 1/2003 | Schad | B29C 45/32 425/338 |
| 7,134,869 | B2 * | 11/2006 | Lichtinger | B29C 45/1628 425/576 |
| 8,360,764 | B2 | 1/2013 | Armbruster et al. | |
| 8,469,693 | B2 * | 6/2013 | Schad | B22D 17/22 425/190 |
| 8,672,668 | B2 | 3/2014 | Armbruster | |
| 8,764,434 | B2 | 7/2014 | Armbruster | |
| 9,168,687 | B2 * | 10/2015 | Armbruster | B29C 45/045 |
| 2006/0244178 | A1 * | 11/2006 | Armbruster | B29C 45/006 264/255 |
| 2014/0134366 | A1 | 5/2014 | Armbruster | |
| 2014/0308388 | A1 | 10/2014 | Armbruster | |

FOREIGN PATENT DOCUMENTS

| | | |
|---|---|---|
| EP | 1 119 449 B1 | 8/2001 |
| EP | 1 155 802 A2 | 11/2001 |
| EP | 1 725 386 B1 | 11/2006 |
| JP | H02 171221 A | 7/1990 |
| WO | WO 2007/082394 A1 | 7/2007 |
| WO | WO 2011/107395 A1 | 9/2011 |

* cited by examiner

RETAINING DEVICE FOR A TURNING SYSTEM

BACKGROUND OF THE INVENTION

Field of the Invention

The present invention relates to the field of tools and machines for injection molding of plastic.

Discussion of Related Art

Injection molding devices having one or more rotating center parts are known from the prior art. These are used for the efficient manufacture of multi-component plastic parts by injection molding. At least one rotatable center part, which is fixed to a holding device and is rotatably arranged about an axis of rotation, is arranged between two mold halves, the mold halves being movable against one another along tie bars in a first direction. The rotatable center part has at least two parallel side surfaces, along which it interacts with the two mold halves for the formation of the cavities. In certain embodiments, the rotatable center part can interact at least on one side with a further rotatable center part. Coordination means effect that the rotatable center part remains positioned centrally between the two mold halves during opening and closing, and thus collisions are avoided. Several holding devices for the rotatable middle part are known from the prior art.

EP1035959 and EP1155802 were published in 1999 by the same applicant, and both relate to a holding device for a rotatable center part (mold, mold-half, mold carrier). The holding device has a lower and an upper cross member which are guided along the tie bars of an injection molding machine. Each cross member of the holding device has a rotatable holding means, which serves for releasable clamping of the mold, mold half or the mold carrier therebetween.

EP1725386 of the same applicant was published in 2005, and relates to a method and an injection molding device with more than one rotatable center part. This makes it possible to manufacture parts in two outer parting plane and to assemble these in a further parting plane in a further manufacturing step. In the figures, different embodiments of holding devices for the rotatable center parts are illustrated.

WO2011/107395 by the same applicant was published in 2011 and describes a holding device with a modular structure, which can be flexibly adapted to different injection molding machines. Different types of holding are described.

EP1119449 by the company Krauss Maffei was first published in 2001 and shows a two-plate horizontal injection molding machine. It has a holding device for a rotatable center part mounted on the machine bed. The holding device in the invention is fully detached from the rails and has no operative connection with these. All forces are transmitted via the machine bed.

SUMMARY OF THE INVENTION

An object of the invention is to show an improved holding device for a rotatable center part in an injection molding device, which enables shorter cycle times.

Reduction of cycle time is a viable means to increase production capacity. However, increased forces also occur thereby, because the machine parts must be more strongly accelerated and decelerated so that they can keep up with the pace of the machine. Optimal introduction and transmission of forces is an important aspect in order to be able to guarantee the robustness and durability of the device. Negatively impacting constraining forces are to be avoided. One aspect of the invention consists of targetedly apportioning the forces and the flow thereof across a plurality of machine elements. Thereby, the weight loads and the torques between a rotatable center part or a holding device therefore, respectively, and an injection molding machine, are partially or completely separately transmitted.

A holding device according to the invention can be configured in several ways. In a preferred embodiment, the device has at least one base, the base being supported on a machine bed of the injection molding machine and displaceable in the longitudinal direction of tie bars of the injection molding machine. An embodiment of the invention comprises a holding device for a mold center part in an injection molding machine, the mold center part being rotatable about a vertical axis. The holding device has a lower rotary plate which is rotatable about an axis of rotation and which is driven by a motor, the rotary plate serving to receive and hold the rotatable mold center part. If necessary, a plurality of holding devices can be arranged one behind the other. The lower rotary plate is arranged rotatably about a vertical axis with respect to a lower cross member. The lower cross member is movably mounted in the longitudinal direction of the injection molding machine via first bearing blocks and guide rails being supported on a machine bed of the injection molding machine. The holding device comprises second bearing blocks, by means of which the lower cross member is supported in the circumferential direction relative to a pair of lower tie bars of the injection molding machine. To avoid negative forces relative to the tie bars, the second bearing blocks can be floatingly mounted at least in the vertical direction relative to the lower cross member. Alternatively or additionally, the second bearing blocks can be adjustably arranged relative to the lower cross member. Depending on the area of application, the second bearing blocks can form a unit with the first bearing blocks. The second bearing blocks may at least partially engage around the tie bars from the inside outwards. The second bearing blocks are advantageously arranged in pairs on a tie bar. If the forces do not exceed a certain level, the second bearing blocks may also be arranged diagonally with respect to the cross member. For a good transmission of forces, the second bearing blocks are arranged along the tie bar at a distance from one another. In order to achieve a structurally flexible arrangement, at least one second bearing block can be operatively connected from one side and/or from above with the cross member via an adapter. The cross member is advantageously formed in multiple parts, so that it can be flexibly adapted to the circumstances. It may have a central part and one or more side parts fixed thereon. In general, the second bearing blocks are fixed to the central part and/or at least one of the side parts. Advantageously, attention is paid to short load paths. The second bearing blocks are used primarily for the transmission of the reaction forces which occur due to the drive torque. Weight forces are preferably transmitted via the first bearing blocks to the machine bed.

In certain cases, the cross member can also be formed as a (flat) base plate. At least one second bearing block may be arranged on the base plate. At least one second bearing block may be releasably operatively connected to the cross member.

BRIEF DESCRIPTION OF THE DRAWINGS

Aspects of the invention will be described in greater detail with reference to the exemplary embodiments shown in the following figures and the description associated therewith. Shown are.

DETAILED DESCRIPTION OF THE INVENTION

Figure 1:
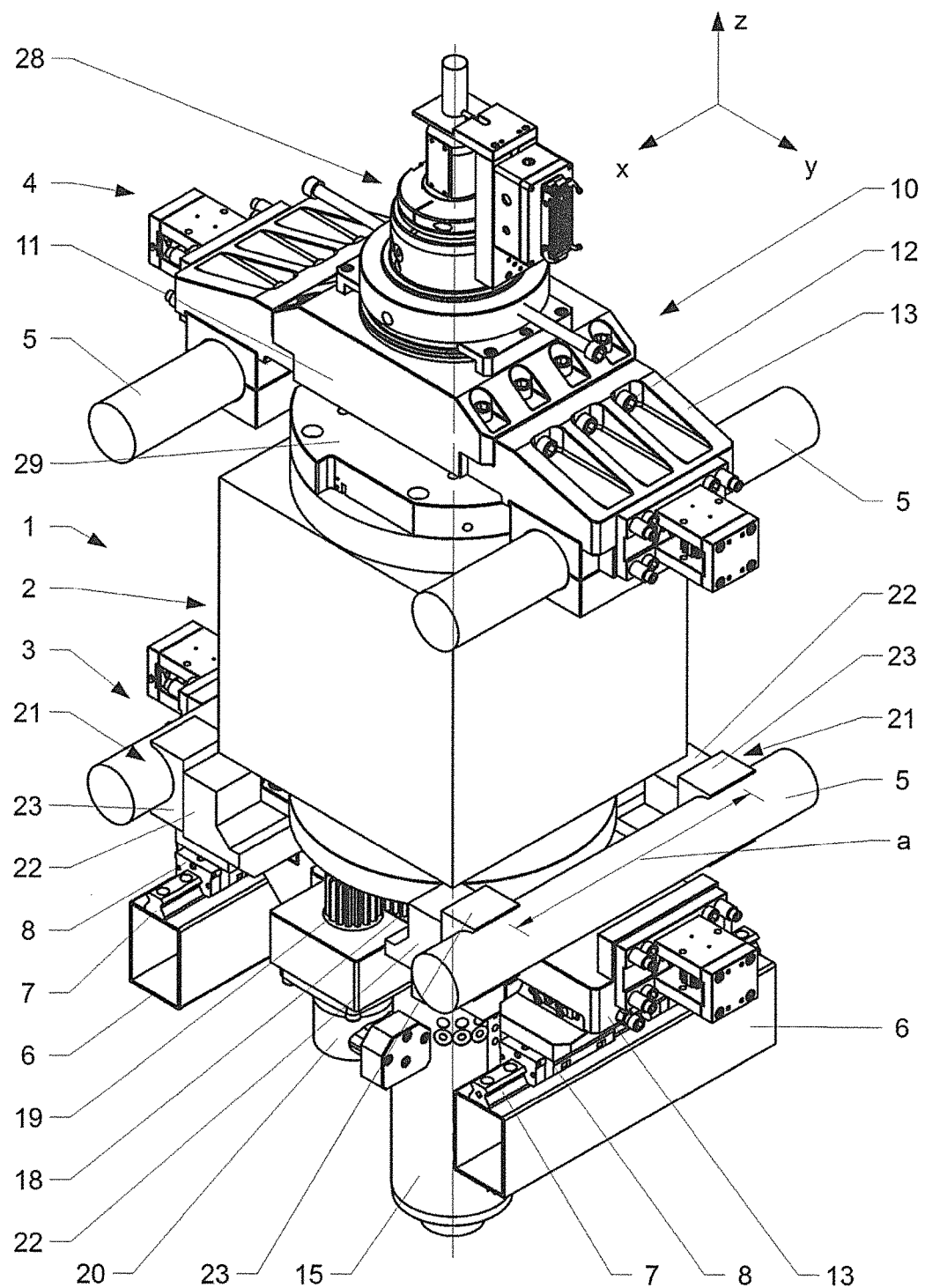
FIG. 1 is a first embodiment of a holding device according to the invention obliquely from the front and above.
Figure 2:
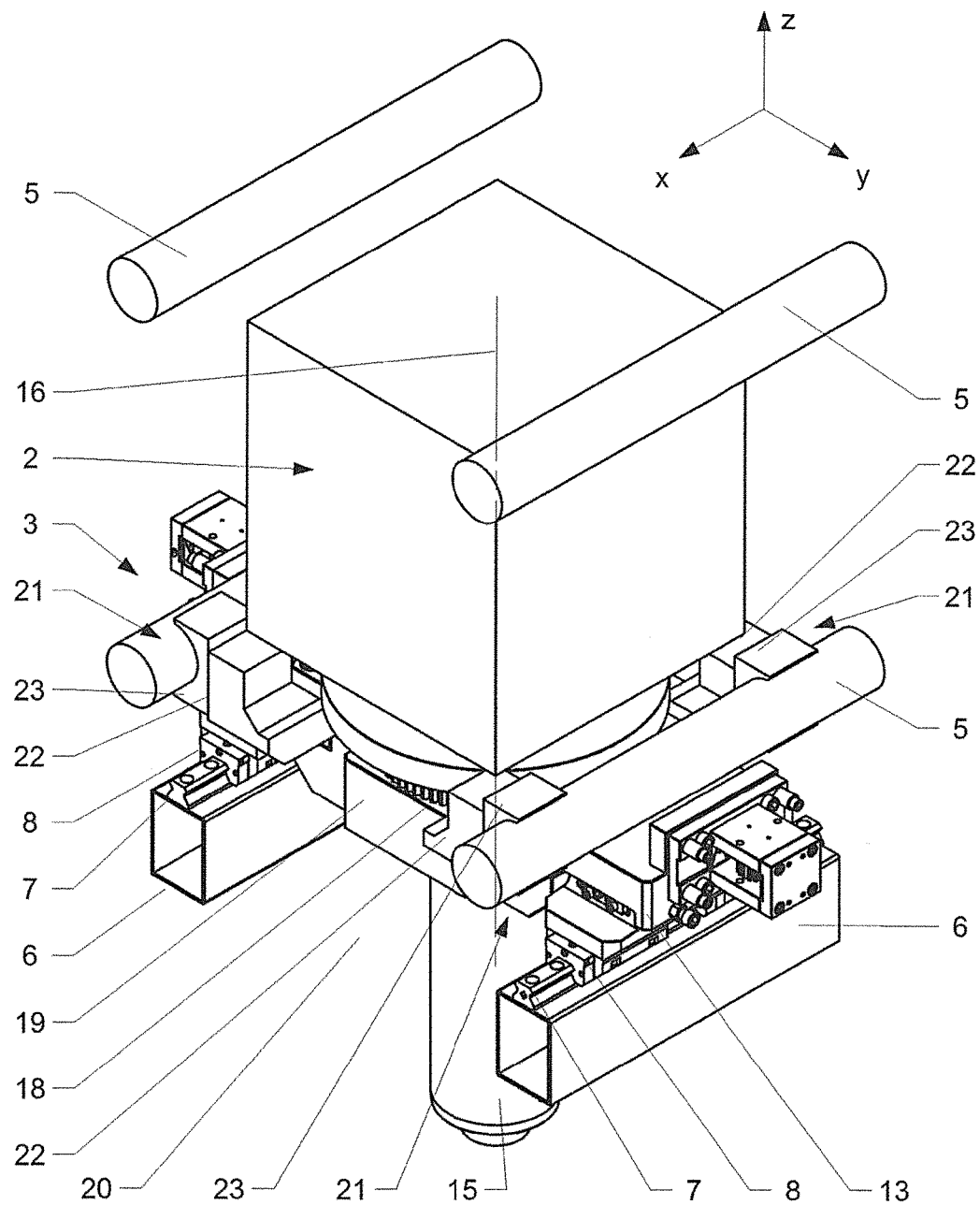
FIG. 2 is a second embodiment of a holding device according to the invention obliquely from the front and above.

FIG. 1 shows a first embodiment of a holding device 1 according to the invention for a rotatable mold center part 2 in a perspective view obliquely from above. FIG. 2 shows a second embodiment of a holding device 1 in a perspective view obliquely from above.

The remaining parts of the injection molding machine, including the mold mounting plates, etc., and of the tool, including first and second mold half, are not shown.

Figure 3:
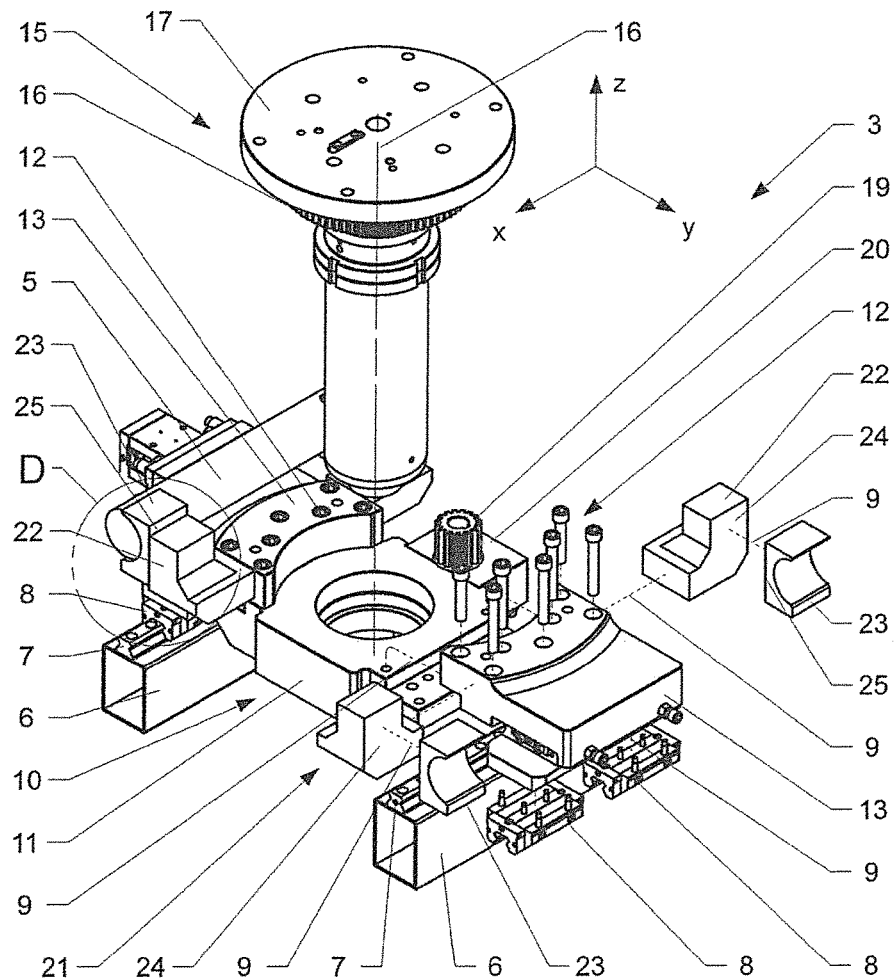
FIG. 3 is the lower part of the holding device in an exploded view.
Figure 4:
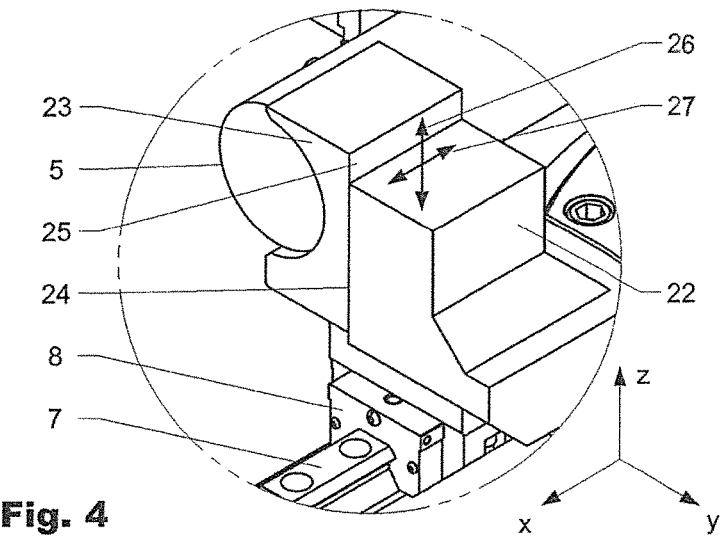
FIG. 4 is Detail D of FIG. 3

Both variants of the holding device 1 have a lower holding device 3, which is shown partially disassembled in FIGS. 3 and 4. In contrast to the first embodiment (see FIG. 1), the second embodiment shown in FIG. 2 has an additional upper holding device 4.

The tie bars 5 of an injection molding machine (not shown in detail) extending in the longitudinal direction (x-direction) of the injection molding machine are shown in FIGS. 1 to 3. Two carriers 6 of the injection molding machine likewise extending in the longitudinal direction of the injection molding machine, the carriers forming a machine bed 6, are further shown. Depending on the type of injection molding machine, the machine bed may also have a different configuration.

As can be seen in FIGS. 3 and 4, two linear guides 7 are disposed on the machine bed 6, on which the lower holding device 3 is movably the longitudinal direction (x-direction) supported in by via first bearing blocks 8 in the vertical direction (z-direction). So that the structure of the lower holding device 3 is more visible, only one of the two lower tie bars 5 is shown in FIG. 3. In addition, the right side is shown partially disassembled. How the parts are assembled in the assembly is shown schematically with dashed lines 9. FIG. 4 shows an enlarged detail D of FIG. 3.

In the embodiment shown, the lower holding device 3 has a multi-part cross member 10. This consists of a center part 11 and two side parts 13 fastened thereto with screws 12. The center part 11 has an opening 14, in which is disposed a rotary unit 15. The rotary unit 15 has a lower rotary plate 17, which is used for receiving and holding the mold center part 2, the rotary plate 17 being rotatable about an axis 16. Below the lower rotary plate 17, a first drive wheel 18 can be recognized, which is operatively connected in the assembled state with a second drive wheel 19 of a motor 20. The motor 20 is fixed laterally on the cross member 10 and transmits the driving torque via the drive wheels 18, 19 to the rotary plate 17 and thus to the mold center part 2 arranged on the plate 17. As reaction thereof, the drive torque also acts on the lower cross member 10.

In the shown embodiment, the weight forces acting in the vertical direction are transmitted to the machine bed 6 via the first bearing blocks 8, mounted here from below on the side parts 13, and the guide rails 7. Alternatively or additionally, the torsional forces are transmitted to the tie bars 5 of the injection molding device (not shown in detail) via torsion supports 21, which are fixed laterally on the two side parts 13.

The torsion support 21 consists in the embodiment shown of an adapter 22, on which are arranged second bearing blocks 23 acting transverse to the tie bars. The second bearing blocks 23 act primarily in the circumferential direction. They are designed such that they serve primarily for transmitting of drive torque to the tie bars 5 and thus serve to relieve the first bearing blocks 8 and the guide rails 7, respectively. The bearing blocks 23 and the adapter 22, respectively are connected to the cross member such that they do not transmit negatively impacting vertical (z-direction) forces to the tie bars 5. If necessary, the second bearing blocks may be arranged floatingly (movably) in the z-direction. Flat and/or curved operative connection surfaces come into consideration.

In the embodiment shown, the second bearing blocks 23 are supported on the adapter 22 via first and second operative connection surfaces 24, 25. The operative connection is designed such that the bearing blocks 23 are movable or adjustable, respectively, relative to the associated adapter 22, if needed. This is indicated schematically in FIG. 4 by a first and a second arrow 26, 27. If needed, the operative connection surface 24, 25 can also be curved, or be designed spherically, respectively, so that misalignments of the angles can be corrected. Any possibly necessary compensations can be made, for example, alternatively or additionally between the adapters 22 and the cross member.

In the embodiment shown, the adapters 22 are fixed laterally on the side parts 13. Depending on the area of application and injection molding device, other configurations are possible. For example, the adapter 22 can also be directly integrated into the side parts 22. In order to achieve shorter load paths, the side parts and the second bearing blocks 23 may be arranged on a panel. Both the center part 11 and the side parts 13 may be integrally formed.

In the embodiment shown, the second bearing blocks 23 are formed as half-shells, which only partially engage around the tie bars. The second bearing blocks may, however, also be formed such that they engage with the tie bars from a different direction (e.g. from the outside and/or above and/or below).

In the shown embodiment, two second bearing blocks 23 are arranged on each side, which are each operatively connected in pairs with a tie bar 5. The second bearing blocks 23 are arranged at a distance from one another with respect to the tie bars 5 (see FIG. 1), so that an optimum force transmission is guaranteed.

In the embodiment shown, the upper holding device 4 shown in FIG. 1 is, together with the lower holding device 3, a component of the holding device 1. The upper holding device also has a cross member 10, which is designed in multiple parts. The cross member 10 here also has a center part 11 and two side parts 13 fixed thereto via screws 12. An upper plate 29 is on an upper rotary unit 28. In operation, the rotatable mold center part 2 is clamped between the lower and the upper rotary plate 17, 29. For installation and removal of the mold center part 2, the upper rotary plate 29 can be moved in the vertical direction via a thread 30. In the shown embodiment, the upper rotary plate 29 has no drive for the mold center part 2. Such can be provided if needed.

The invention claimed is:

1. A holding device (1) for a mold comprising a rotatable mold center part (2) in an injection molding machine comprising:
    a lower cross member (10) which is mounted movably in a longitudinal direction (x) of tie bars (5) and guide rails (7) while first bearing blocks (8) are attached to the lower cross member (10) which support the lower cross member (10) via the guide rails (7) on a machine bed (6) of the injection molding machine in a vertical direction (z), and a plate (17) which is rotatable with respect to the lower cross member about an axis of rotation (16) extending in the vertical direction and driven by a drive torque of a motor (20), the plate (17) serving to hold the rotatable mold center part (2), wherein second bearing blocks (23) attached on opposite sides of the lower cross member (10) support the lower cross member (10) in a circumferential direction relative to a pair of lower tie bars (5) of the injection molding machine, and wherein weight forces acting in the vertical direction are transmitted to the machine bed (6) via the first bearing blocks (8) and the guide rails (7) and reaction forces of the drive torque are transmitted to the lower tie bars (5) via the second bearing blocks 23 and wherein the second bearing blocks (23) arranged on opposite sides of the lower cross member (10) are arranged in pairs on the tie bars (5) at a distance (a) from one another.

2. The holding device (1) according to claim 1, wherein the second bearing blocks (23) are floatingly mounted in the vertical direction (26, 27) relative to the lower cross member (10).

3. The holding device (1) according to claim 1, wherein the second bearing blocks (23) are adjustably arranged relative to the lower cross member (10).

4. The holding device (1) according to claim 1, wherein the second bearing blocks (23) at least partially engage around the tie bars (5) from an inside outwards.

5. The holding device (1) according to claim 1, wherein at least one second bearing block (23) is operatively connected with the cross member (10) via an adapter (22).

6. The holding device (1) according to claim 1, wherein the cross member (10) is formed in multiple parts.

7. The holding device (1) according to claim 1, wherein the cross member (10) includes a base plate and the second bearing blocks (23) are arranged on top of and/or laterally on the base plate.

8. The holding device (1) according to claim 1, wherein at least one second bearing block (23) is releasably operatively connected with the cross member (10).

9. The holding device (1) according to claim 1, wherein the holding device (1) comprises an upper holding device (4), mounting the rotatable center part (2) relative to two upper tie bars (5) of the injection molding machine.

10. A holding device (1) for a mold comprising a rotatable mold center part (2) in an injection molding machine comprising:

a lower cross member (10) which is mounted movably in a longitudinal direction (x) of tie bars (5) and guide rails (7) while supported via first bearing blocks (8) via the guide rails (7) on a machine bed (6) of the injection molding machine in a vertical direction (z), and a plate (17) which is rotatable with respect to the lower cross member about an axis of rotation (16) extending in the vertical direction and driven by a drive torque of a motor (20), the plate (17) serving to hold the rotatable mold center part (2), wherein second bearing blocks (23) support the lower cross member (10) in a circumferential direction relative to a pair of lower tie bars (5) of the injection molding machine, and wherein weight forces acting in the vertical direction are transmitted to the machine bed (6) via the first bearing blocks (8) and the guide rails (7) and the drive torque is transmitted to the lower tie bars (5) via the second bearing blocks 23 acting primarily in the circumferential direction, and wherein the second bearing blocks (23) arranged on opposite sides of the lower cross member (10) are arranged in pairs on the tie bars (5) at a distance (a) from one another.

11. A holding device (1) for a mold comprising a rotatable mold center part (2) in an injection molding machine comprising:

a lower cross member (10) which is mounted movably in a longitudinal direction (x) of tie bars (5) and guide rails (7) while supported via first bearing blocks (8) via the guide rails (7) on a machine bed (6) of the injection molding machine in a vertical direction (z), and a plate (17) which is rotatable with respect to the lower cross member about an axis of rotation (16) extending in the vertical direction and driven by a motor (20), the plate (17) serving to hold the rotatable mold center part (2), wherein second bearing blocks (23) support the lower cross member (10) in a circumferential direction relative to a pair of lower tie bars (5) of the injection molding machine, and wherein the second bearing blocks (23) are arranged perpendicular with respect to the first bearing blocks (8) to support the lower cross member (10) in the circumferential direction, and wherein the second bearing blocks (23) arranged on opposite sides of the lower cross member (10) are arranged in pairs on the tie bars (5) at a distance (a) from one another.

* * * * *